Figure 1:
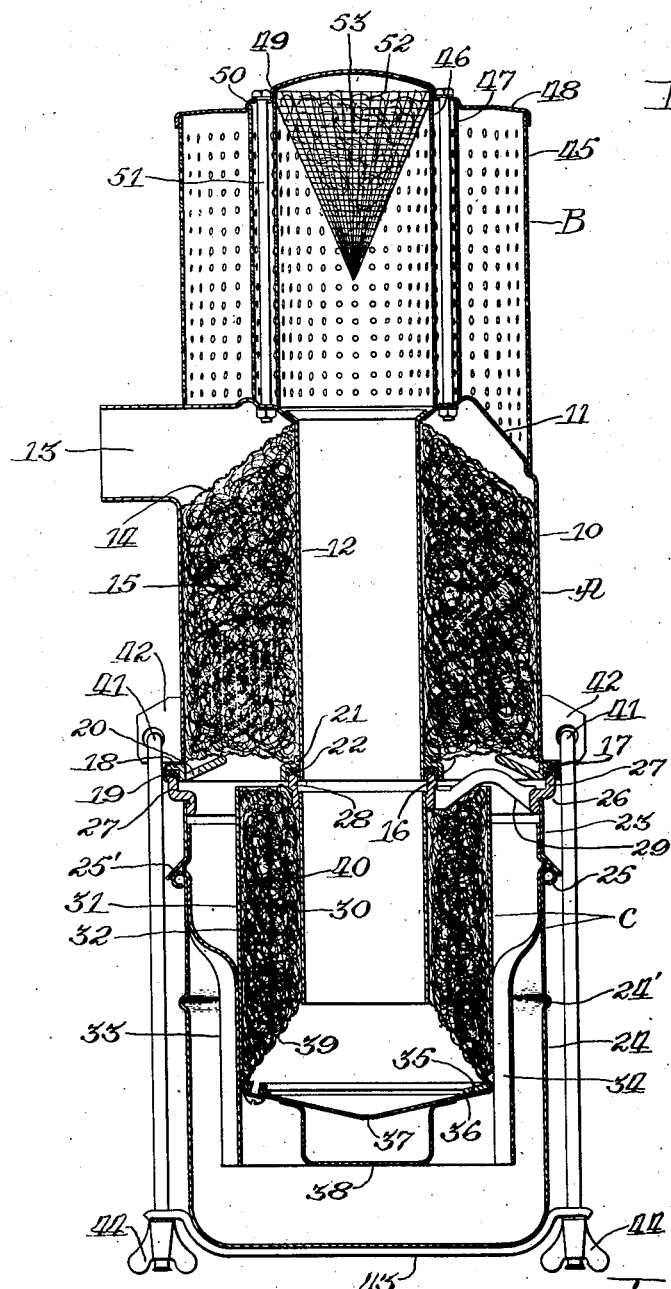

Dec. 1, 1936.    W. C. WILSON    2,062,548
AIR CLEANER
Filed Dec. 29, 1934    2 Sheets-Sheet 1

Inventor
Walter C. Wilson
By V. F. Lassagne
Atty.

Dec. 1, 1936.  W. C. WILSON  2,062,548
AIR CLEANER
Filed Dec. 29, 1934  2 Sheets-Sheet 2

Inventor
Walter C. Wilson
By ...
Atty.

Patented Dec. 1, 1936

2,062,548

UNITED STATES PATENT OFFICE 2,062,548

AIR CLEANER

Walter C. Wilson, Monrovia, Calif., assignor to International Harvester Company, a corporation of New Jersey Application December 29, 1934, Serial No. 759,697

7 Claims. (Cl. 183—10)

This invention relates to an air cleaner. More specifically, it relates to an air cleaner utilizing a wetted filtering material particularly adapted for use on internal combustion engines.

In cleaning the air to be used in internal combustion engines, it is necessary that a high degree of removal of impurities be attained. It has been found that for certain types of dust particles only a liquid, wetted filtering mass is effective to remove a satisfactory percentage of such particles. The Wilson Patent No. 1,838,513, December 29, 1931, shows an air cleaner particularly designed to mix a liquid wetting agent with the air prior to its passage through a filtering material, whereby a continually wetted and washed filtering medium is presented to the air being cleaned. In the use of air cleaners as disclosed and claimed in said patent, certain problems have been encountered. It is to provide an improved air cleaner to meet certain of these problems that the present cleaner has been constructed.

Figure 2:
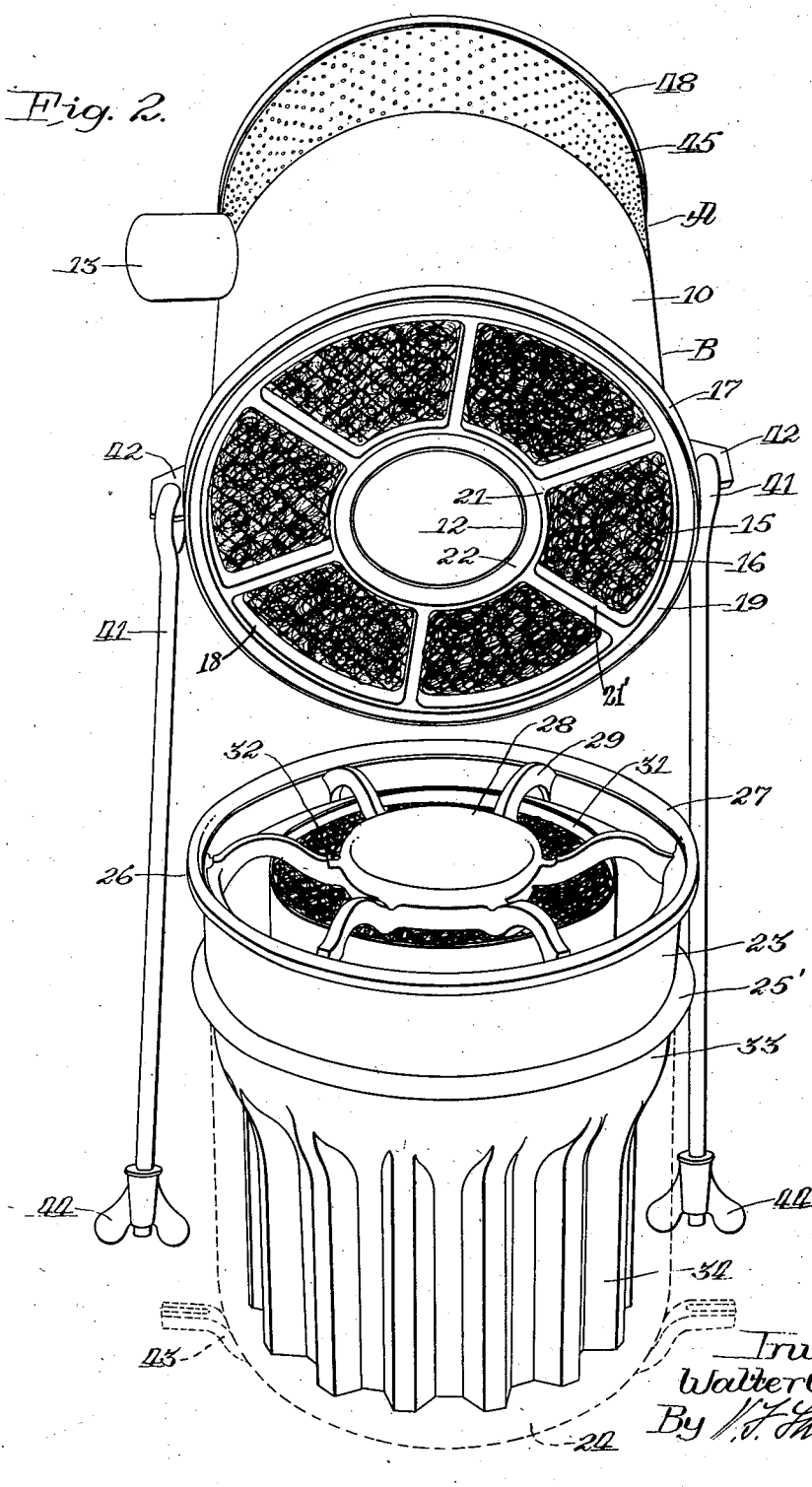

The principal object, therefore, of the present invention is to provide an improved, wetted filtering type of air cleaner designed to be more accessible for cleaning, to take care of the problem of back fire more efficiently, and to provide means for securing the filtering material in position against the effects of vibration. These objects and others which will be apparent from the detailed description to follow are attained by a construction such as shown in the drawings, in which:

Figure 1 is a vertical cross section through the axis of an air cleaner embodying the features of the invention; and, Figure 2 is a perspective view of the upper part of the air cleaner and the lower part, with said upper part removed and tilted to show the interior construction. In this view, the oil reservoir is removed from the bottom, its position having been shown in dotted lines.

The air cleaner as shown may be considered as being formed in three sections. The intermediate section A consists of a cylindrical casing 10 provided with a conical top portion 11, which is formed to provide means for attaching the upper section B. Said top portion 11 is formed to fit the flared upper end of a central air inlet member 12 positioned centrally with respect to the casing 10. An air outlet 13 communicates with the upper end of the casing 10. A conical screen 14 at the upper end of the annular space formed between the casing 10 and the inlet member 12 confines the filtering material 15 positioned in said space at the upper end. An annular screen member 16 confines the filtering material at the lower end of said annular space.

The bottom end of the casing 10 is formed with an enlarged flange 17 in which an annular member 18 is seated. Said member and said flange are formed to provide a recess in which a sealing gasket 19 is fitted. The annular member 18 extends inwardly from the casing wall at an upward angle and is provided with a series of openings 20 for the return of oil draining from the upper filtering material 15.

At the lower end of the inlet member 12, a flanged annular member 21 supports the screen 16 and is formed to provide a recess in which a sealing gasket 22 is fitted. The member 21 is integrally connected by ribs 21' with the member 18, as best shown in Figure 2.

The lower section C of the cleaner consists of a lower casing section 23 and a cup-shaped liquid reservoir 24 telescopically fitted over the casing section, being provided with a bead 25 which engages a flange 25' formed on said casing section.

At its upper end the casing section is secured to a member 26. Said member is formed with an annular outer flange 27 which engages the gasket 19 and with an annular inner flange 28, which seats against the gasket 22. Said flanges are joined by ribs 29.

An air inlet member 30, which is a continuation of the inlet member 12, is secured at its upper end to the flange 28 and terminates on substantially the liquid level line which is to be maintained at the bead 24' formed around the reservoir 24. A cylindrical wall 31 concentric with respect to the inlet member 30 and spaced therefrom to form an annular chamber for filtering material 32 is secured in position by engagement at its lower end with a crimped-in portion 33 of the casing 23. It will be noted that the casing 23 is formed at its upper end of two overlapped sections of sheet metal. However, the casing will be referred to as a unitary construction. The crimped-in portion 33 of the casing is formed to provide a series of channels 34 communicating at their upper ends with the space between the wall 31 and the casing 23 and at their lower ends with the liquid reservoir 24, thereby providing return passages for oil from the filtering material.

The wall 31 terminates a substantial distance below the normal liquid level and below the lower end of the inlet member 30 and is provided with an inturned flange which engages an annular member 35. A conically shaped bottom member 36 secured to the member 35 is provided with a central opening 37 for the inlet of liquid. A handle 38 is secured to the bottom for handling it during removal and replacement.

A conical screen 39 extends from the bottom of the inlet member 30 to the bottom of the wall 31, confining the filtering material 32 in the annular compartment formed by said elements. To prevent the shaking down of the filtering material 32, an annular screen member 40 has been shown embedded in the filtering material approximately midway between the member 30 and the wall 31. Said screen is of a heavy gauge material having substantial rigidity whereby it reinforces the filtering material 32 and reduces the tendency of said material to wear by vibration and to settle down due to breaking down of the filter fibers. Preferably, the filtering material is of a suitable gauge of wire properly crimped, although other filtering materials may be utilized.

To secure the casing member in position against the gaskets 19 and 22, and to secure the reservoir 24 frictionally fitted over the lower end of the casing member, clamping rods 41 are secured to ears 42 on the central casing section 10 and engage the outer ends of a cross member 43 secured to the liquid reservoir 24. Wing nuts 44, threaded on said rods, adjustably secure the reservoir and lower casing section in position.

The upper section B of the air cleaner consists of air inlet means and means to catch the oil delivered by back fire. An outer cylindrical screen 45 is mounted on the casing member 19 and suitably secured thereto by brazing or by other suitable methods. Two spaced concentric screens 46 and 47 are also mounted on the casing member 10. A top member 48, having a flange fitted over the top of the member 45, is formed also with shoulders 49 and 50 to engage the upper ends of the screens 46 and 47. Tie rods 51 extending through the top member 48 and the portion 11 of the casing 10 secure the screens in position at the top of the casing 10. A conical screen 52 fitted within the top end of the inner screen 46 depends downwardly with the apex of the cone lying on the axis of the inlet member 12. The screen 52 is filled with a fibrous material 53 capable of holding by capillary attraction or by absorption a considerable quantity of liquid.

In the operation of the air cleaner as above described, suction applied to the outlet 13 induces a flow of air through the screens 45, 46 and 47, through the inlet members 12 and 13 and up through the filtering material 32 and 15. Liquid at the bottom of the inlet member 30 is carried upwardly through the filtering material 32, being replenishable through the opening 37. The cross sectional area of the filtering material 32 is small enough to insure entraining of the liquid and carrying of it therethrough during operation of the cleaner at different rates of air flow. At the top of the wall 31 the air stream carrying the entrained liquid enters the filtering material 15, which is more loosely packed and is of a much larger cross sectional area. Due to the decrease in velocity, the liquid flows out of the air stream and returns down the outer wall of the casing 10 through the openings 20 and the channels 34, back to the liquid reservoir 24. This principle of operation is covered by my prior Patent No. 1,838,513.

In the event of back fire, liquid at the bottom of the inlet member 30 is thrown upwardly through said member and through the inlet member 12. Said liquid is projected substantially in a straight line against the conical screen 52 and is absorbed by the material 53 within the screen. The cone is made of sufficient capacity to hold the amount of liquid delivered by the normal number of successive back fires. The liquid subsequent to the back fire drains from the apex of the cone back to the air stream. It has been found that the conical-shaped receptacle for liquid thrown by back fire is particularly effective in both receiving and holding the liquid and in delivering it back into the air stream from the apex of the cone. There is no tendency for liquid dripping off the apex to be thrown out through the inlet screens during a subsequent back fire. This difficulty has at times been encountered in the constructions of the prior art for the same purposes as disclosed and claimed in United States Patent No. 1,864,289 issued June 21, 1932, to Anglemyer et al.

In the installations of air cleaners of this type on automobiles where it is desirable that they be positioned under the hood, difficulty has been found in locating the cleaner where the oil reservoir can be removed. It is particularly to meet this problem that the cleaner as herein described was developed. By forming the cleaner casing in two sections with gaskets as described, only a very small amount of vertical clearance is required, after loosening the clamping means, to slide the bottom section horizontally and to then remove it from position. This division plane has been advantageously located at the division between the two filtering steps, thereby forming a very satisfactory cleaning construction, both from the standpoint of cost in manufacturing and adaptability to the two stage filtering principle.

Although applicant has shown and described only a preferred embodiment of an air cleaner showing certain improved features, it is to be understood that he claims as his invention all modifications falling within the scope of the appended claims.

What is claimed is:

1. An air cleaner comprising a two section casing, the sections being separable in a horizontal plane, aligned vertical air inlet conduits in said sections, filtering material positioned in the sections in the annular spaces around said conduits, an outlet from the upper section, a liquid reservoir formed in the lower section, said lower section being formed to deliver air from the inlet conduit therein to the bottom of the filtering material therein, and means for delivering liquid from the reservoir to the air stream prior to passage into the filtering material.

2. An air cleaner comprising a two section casing, the sections being separable in a horizontal plane, aligned vertical air inlet conduits in said sections, filtering material positioned in the sections in the annular spaces around said conduits, an outlet from the upper section, a liquid reservoir formed in the lower section, said lower section being formed to deliver air from the inlet conduit therein to the bottom of the filtering material therein, means for delivering liquid from the reservoir to the air stream prior to passage into the filtering material, and means for returning oil draining from the upper filtering material to the reservoir in the lower section.

3. An air cleaner comprising a two section casing, the sections being separable in a horizontal plane, aligned vertical air inlet conduits in said sections, filtering material positioned in the annular spaces around said conduits, an outlet from the upper section, a liquid reservoir formed in the lower section, said lower section being formed to deliver air from the conduit therein to the bottom of the filtering material therein, means for delivering liquid from the reservoir to the air stream prior to passage into the filtering material, the filtering material in the lower section offering sufficient resistance to enable the normal air flow to carry liquid therethrough and the filtering material in the upper section being of a sufficiently low restriction to permit liquid to drop out of the air stream during normal air flow, and means for returning the liquid to the reservoir in the lower section.

4. An air cleaner comprising an upper section having a central air inlet conduit formed therein, filtering material around said conduit, an air outlet means from said filtering material, a lower section detachably secured to the upper section having a central air inlet conduit formed therein in communication with the air inlet conduit of the upper section, filtering material positioned around said conduit, communicating means between the interior of the conduit and the filtering material, said lower section being provided with a liquid reservoir in communication with the air passage, and means for delivering oil from the upper section to the lower section out of the path of air flow.

5. An air cleaner comprising an upper section having a central air inlet conduit formed therein, filtering material around said conduit, an air outlet means for said filtering material, a lower section detachably secured to the upper section having a central air inlet conduit formed therein in communication with the air inlet conduit of the upper section, filtering material positioned in the lower section around said air inlet conduit, communicating means between the interior of the air inlet conduit in the lower section and the filtering material therein, means for delivering liquid to the air stream prior to entrance into the filter of the lower section, and means to deliver oil from the upper section back to said liquid supply means.

6. An air cleaner comprising a casing having a central air inlet extending downwardly therethrough from the upper end, forming a chamber annular in cross section between the inlet and the casing, an air outlet from the casing at the upper end thereof, filtering material positioned between the air inlet and the casing in the upper half thereof, and means forming a compartment for filtering material in the lower half of the casing annular in cross section and appreciably less in cross section than the upper filtering material compartment, said casing being divided in a central location to permit removal of the lower half of the casing together with the filtering material in that part of the casing.

7. An air cleaner comprising an upper body portion consisting of spaced cylindrical walls, filtering material positioned between said walls, an air outlet connected with the outer wall above the filtering material, an air inlet in communication with the interior of the inner wall, and a lower section consisting of spaced substantially cylindrical walls in alignment with the walls of the upper portion, sealing means between said walls, an intermediate wall between said walls, filtering material between the intermediate wall and the inner wall, the inner wall being in communication with the space occupied by said filtering material, a liquid reservoir fitted over the lower section, and means for clamping said reservoir in position over the end of the lower section and for clamping the lower section in position against the upper section.

WALTER C. WILSON.